(12) United States Patent
Nakazawa et al.

(10) Patent No.: US 12,230,144 B2
(45) Date of Patent: Feb. 18, 2025

(54) FLIGHT ROUTE GUIDANCE SYSTEM, FLIGHT ROUTE GUIDANCE DEVICE AND FLIGHT ROUTE GUIDANCE METHOD

(71) Applicant: RAKUTEN GROUP, INC., Tokyo (JP)

(72) Inventors: Mitsuru Nakazawa, Tokyo (JP); Hiroaki Iwase, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 835 days.

(21) Appl. No.: 17/042,198

(22) PCT Filed: Nov. 21, 2018

(86) PCT No.: PCT/JP2018/043028
§ 371 (c)(1),
(2) Date: Sep. 28, 2020

(87) PCT Pub. No.: WO2020/105147
PCT Pub. Date: May 28, 2020

(65) Prior Publication Data
US 2021/0118311 A1    Apr. 22, 2021

(51) Int. Cl.
*G08G 5/00* (2006.01)
*B64U 10/14* (2023.01)
(Continued)

(52) U.S. Cl.
CPC ........... *G08G 5/0021* (2013.01); *B64U 10/14* (2023.01); *B64U 50/19* (2023.01); *G01C 23/005* (2013.01);
(Continued)

(58) Field of Classification Search
CPC .. G08G 5/0021; G08G 5/0026; G08G 5/0013; G08G 5/0052; G08G 5/006;
(Continued)

(56) References Cited

U.S. PATENT DOCUMENTS

2006/0005147 A1* 1/2006 Hammack ............ G08G 5/0021
715/855
2012/0206485 A1* 8/2012 Osterhout ............... G06F 1/163
345/633

(Continued)

FOREIGN PATENT DOCUMENTS

CN    101750086 A    6/2010
CN    108664037 A    10/2018
(Continued)

OTHER PUBLICATIONS

International Search Report for PCT/JP2018/043028 with English translation.
(Continued)

*Primary Examiner* — Aniss Chad
*Assistant Examiner* — Stephanie T Su
(74) *Attorney, Agent, or Firm* — HEA LAW PLLC

(57) ABSTRACT

A flight route information acquisition module acquires flight route information indicating a flight route of an unmanned aerial vehicle in a real space. A real space position/direction identifier identifies a visually recognized position and a visually recognized direction in the real space. A flight route image generator generates a flight route image representing the flight route viewed from the visually recognized position in the visually recognized direction based on the flight route information. A display controller displays the flight route image under a state in which a position of the flight route
(Continued)

image is matched with a situation viewed from the visually recognized position in the visually recognized direction in the real space on a display.

22 Claims, 10 Drawing Sheets

(51) Int. Cl.
*B64U 50/19* (2023.01)
*G01C 23/00* (2006.01)
*G02B 27/01* (2006.01)
*G06T 19/00* (2011.01)
*B64U 50/30* (2023.01)
*B64U 101/30* (2023.01)

(52) U.S. Cl.
CPC ........ *G02B 27/0172* (2013.01); *G06T 19/006* (2013.01); *B64U 50/30* (2023.01); *B64U 2101/30* (2023.01); *B64U 2201/10* (2023.01); *B64U 2201/20* (2023.01); *G02B 2027/0141* (2013.01)

(58) Field of Classification Search
CPC .. G08G 5/0069; B64C 39/024; G01C 23/005; G02B 27/0172; G02B 2027/0141; G06T 19/006; G06T 2219/004; G06T 19/003; B64U 10/13; B64U 2201/10; B64U 2201/20
See application file for complete search history.

(56) References Cited

U.S. PATENT DOCUMENTS

| 2015/0211883 | A1* | 7/2015 | He | G05D 1/102 340/946 |
|---|---|---|---|---|
| 2016/0078770 | A1* | 3/2016 | Coulmeau | G08G 5/0039 701/3 |
| 2016/0241767 | A1* | 8/2016 | Cho | G06F 3/04842 |
| 2018/0108260 | A1 | 4/2018 | Kuhara | |
| 2018/0196425 | A1 | 7/2018 | Kobayashi | |
| 2018/0281950 | A1* | 10/2018 | Aruga | G05D 1/0016 |

FOREIGN PATENT DOCUMENTS

| JP | H0994352 | A | 4/1997 |
|---|---|---|---|
| JP | H09251600 | A | 9/1997 |
| JP | 2001276431 | A | 10/2001 |
| JP | 2003076260 | A | 3/2003 |
| JP | 2004113325 | A | 4/2004 |
| JP | 2007267485 | A | 10/2007 |
| JP | 2010509946 | A | 4/2010 |
| JP | 2011215856 | A | 10/2011 |
| JP | 2013235367 | A | 11/2013 |
| JP | 2018081675 | A | 5/2018 |
| JP | 2018112809 | A | 7/2018 |

OTHER PUBLICATIONS

Office Action of Jan. 5, 2021, for corresponding JP Patent Application No. 2020-547431 with partial English translation pp. 1-5.
Office Action of Nov. 6, 2023, for corresponding CN Patent Application No. 201880093649.9 with partial translation.

* cited by examiner

FLIGHT ROUTE GUIDANCE SYSTEM, FLIGHT ROUTE GUIDANCE DEVICE AND FLIGHT ROUTE GUIDANCE METHOD

CROSS REFERENCE TO RELATED APPLICATIONS

This application is a National Stage of International Application No. PCT/JP2018/043028 filed on Nov. 21, 2018. The contents of the above document is incorporated herein by reference in its entirety.

TECHNICAL FIELD

The present invention relates to a flight route guidance system, a flight route guidance device, and a flight route guidance method.

BACKGROUND ART

In Patent Literature 1, there is described a transparent head-mounted display configured to allow a user to visually recognize a virtual image such as a marker image that facilitates identification of an own vehicle, a movement direction image indicating a movement direction of the own vehicle, or a predicted position image indicating a position that is predicted to be reached after a predetermined period of time. With the technology described in Patent Literature 1, even when the own vehicle has moved far away or a plurality of unmanned aerial vehicles are visible to the user, the user is less likely to lose sight of the own vehicle. Further, it is possible to easily grasp the movement direction or predicted position of the own vehicle, for example.

In Patent Literature 2, there is described an operation management technology of correcting a flight route of an unmanned aerial vehicle based on a weather condition. It is possible to allow the unmanned aerial vehicle to fly more safely by causing the unmanned aerial vehicle to fly in accordance with a flight route provided by the operation management technology described in Patent Literature 2.

CITATION LIST

Patent Literature

[PTL 1] JP 2018-112809 A
[PTL 2] JP 2018-081675 A

SUMMARY OF INVENTION

Technical Problem

With the technologies described in Patent Literature 1 and Patent Literature 2, an operator, manager, or other such persons of the unmanned aerial vehicle cannot grasp both of the situation of the unmanned aerial vehicle in flight and the flight route of the unmanned aerial vehicle at the same time. Thus, the operator, manager, or other such persons of the unmanned aerial vehicle sometimes have a difficulty in grasping whether the unmanned aerial vehicle in flight stays on track of the flight route. Further, the operator, manager, or other such persons of the unmanned aerial vehicle sometimes have a difficulty in grasping how to cause the unmanned aerial vehicle to get back on track of the flight route when the unmanned aerial vehicle in flight is deviating from the flight route.

One or more embodiments of the present invention have been made in view of the above-mentioned issue, and are directed to provide a flight route guidance system, a flight route guidance device, and a flight route guidance method, which are capable of grasping a situation of an unmanned aerial vehicle in flight and a flight route of the unmanned aerial vehicle at the same time.

Solution to Problem

In order to solve the above-mentioned issue, according to one embodiment of the present invention, there is provided a flight route guidance system including: flight route information acquisition means for acquiring flight route information indicating a flight route of an unmanned aerial vehicle in a real space; identification means for identifying a visually recognized position and a visually recognized direction in the real space; image generation means for generating an image representing the flight route viewed from the visually recognized position in the visually recognized direction based on the flight route information; and display control means for displaying the image under a state in which a position of the image is matched with a situation viewed from the visually recognized position in the visually recognized direction in the real space, on a display.

In one aspect of the present invention, the identification means is configured to identify: the visually recognized position associated with a position of the display included in an optical see-through head-mounted display at which a wearer of the optical see-through head-mounted display visually recognizes the image together with the situation viewed from the visually recognized position in the visually recognized direction in the real space; and the visually recognized direction associated with a direction of the display.

Alternatively, the identification means is configured to identify the visually recognized position associated with a position of a camera picking up an image of the real space, and the visually recognized direction associated with an image-pickup direction of the camera, and the image generation means is configured to generate the image in which the flight route viewed from the visually recognized position in the visually recognized direction is superimposed on the image picked up by the camera.

In this aspect, the identification means may be configured to identify the visually recognized position associated with the position of the camera included in a video see-through head-mounted display, and the visually recognized direction associated with the image-pickup direction of the camera, and the display control means may be configured to display the image on the di splay included in the video see-through head-mounted display.

Further, the head-mounted display may be worn on a head of an operator of the unmanned aerial vehicle.

Further, in one aspect of the present invention, the flight route guidance system further includes virtual space generation means for generating a virtual space in which a virtual object representing the flight route is arranged, the identification means is further configured to identify: a visually recognized position in the virtual space, which is associated with the visually recognized position in the real space; and a visually recognized direction in the virtual space, which is associated with the visually recognized direction in the real space, and the image generation means is configured to generate the image representing a situation viewed from the visually recognized position in the virtual space and in the visually recognized direction in the virtual space.

Further, in one aspect of the present invention, the image generation means is configured to generate the image in a mode that depends on whether the unmanned aerial vehicle stays on track of the flight route.

Further, in one aspect of the present invention, the flight route guidance system further includes determination means for determining whether the unmanned aerial vehicle stays on track of the flight route, and the display control means is configured to control whether to display an image obtained by correcting a position at which the flight route is represented, in accordance with a result of determination by the determination means.

In this aspect, the determination means may be configured to determine whether the unmanned aerial vehicle stays on track of the flight route based on a measured position of the unmanned aerial vehicle and the flight route information.

Further, in one aspect of the present invention, the flight route information indicates, for each of a plurality of positions on the flight route, a time point at which the unmanned aerial vehicle is to arrive at the each of the plurality of positions on the flight route, and the image generation means is configured to generate the image further representing the time point.

In this aspect, the image generation means may be configured to generate the image representing, for each of a plurality of positions on the flight route, whether the time point at which the unmanned aerial vehicle is to arrive at the each of the plurality of positions on the flight route is before or after a current time point.

Further, in one aspect of the present invention, the flight route information indicates a plurality of selectable flight routes, and the image generation means is configured to generate the image allowing a selected flight route and an unselected flight route among the plurality of selectable flight routes to be distinguished from each other.

Further, in one aspect of the present invention, the image generation means is configured to generate the image representing at least one of a predicted flight route of the unmanned aerial vehicle or an actual flight route of the unmanned aerial vehicle which is indicated by the flight route information.

Further, in one aspect of the present invention, the flight route information acquisition means is configured to acquire the flight route information indicating the flight route of each of a plurality of unmanned aerial vehicles, and the image generation means is configured to generate the image representing the flight route of each of the plurality of unmanned aerial vehicles.

In this aspect, the image generation means may be configured to generate the image allowing the flight route of the unmanned aerial vehicle operated by an operator viewing the image and a flight route of another unmanned aerial vehicle to be distinguished from each other.

Further, in one aspect of the present invention, the unmanned aerial vehicle has an autonomous flight function.

Further, according to one embodiment of the present invention, there is provided a flight route guidance device including: flight route information acquisition means for acquiring flight route information indicating a flight route of an unmanned aerial vehicle in a real space; identification means for identifying a visually recognized position and a visually recognized direction in the real space; image generation means for generating an image representing the flight route viewed from the visually recognized position in the visually recognized direction based on the flight route information; and display control means for displaying the image under a state in which a position of the image is matched with a situation viewed from the visually recognized position in the visually recognized direction in the real space, on a display.

Further, according to one embodiment of the present invention, there is provided a flight route guidance method including the steps of: acquiring flight route information indicating a flight route of an unmanned aerial vehicle in a real space; identifying a visually recognized position and a visually recognized direction in the real space; generating an image representing the flight route viewed from the visually recognized position in the visually recognized direction based on the flight route information; and displaying the image under a state in which a position of the image is matched with a situation viewed from the visually recognized position in the visually recognized direction in the real space, on a display.

DESCRIPTION OF EMBODIMENTS

Now, one embodiment of the present invention is described with reference to the drawings.

Figure 1:
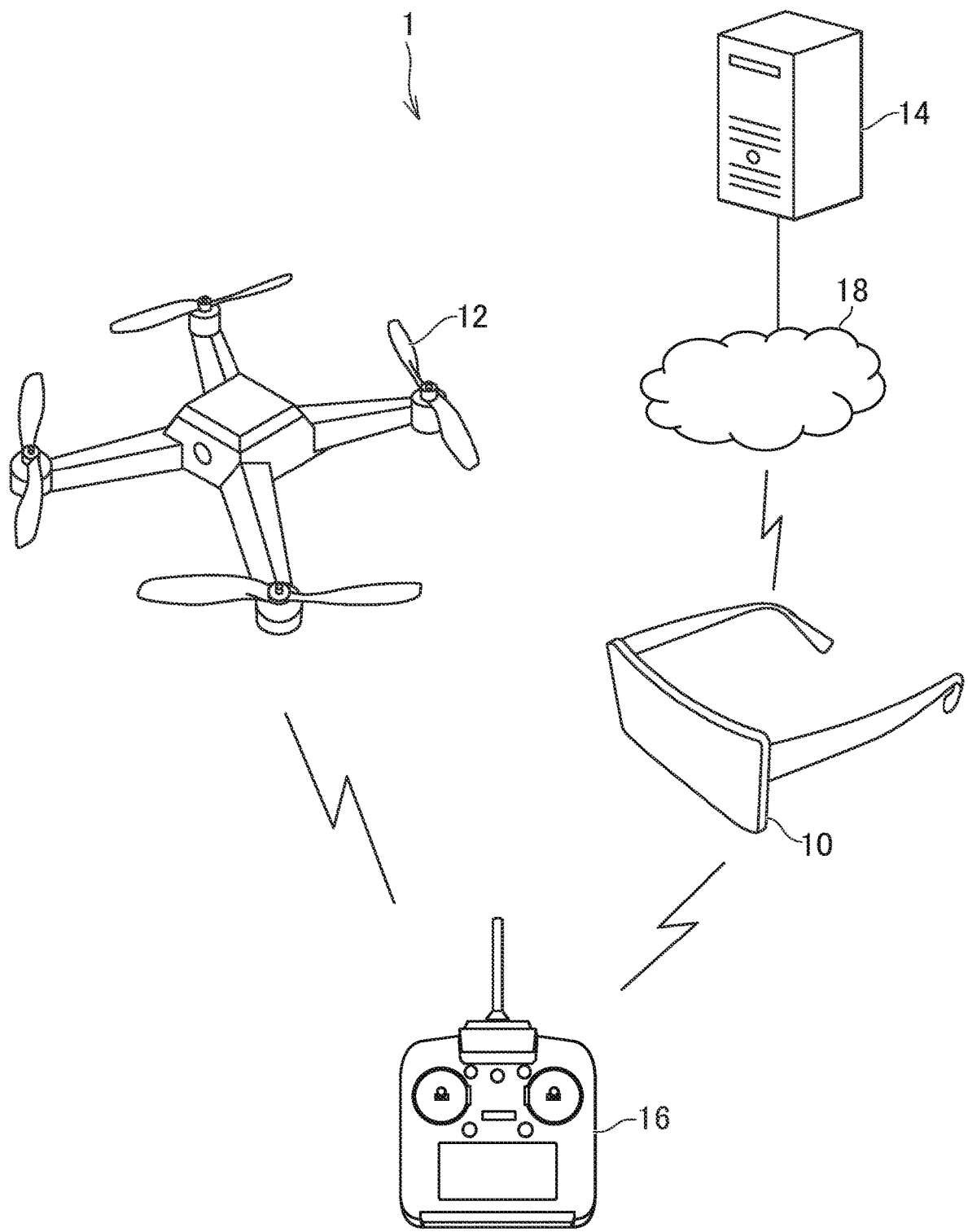
FIG. 1 is a diagram for illustrating an example of an overall configuration of a flight route guidance system according to one embodiment of the present invention.

FIG. 1 is a diagram for illustrating an example of an overall configuration of a flight route guidance system 1 according to one embodiment of the present invention. As illustrated in FIG. 1, the flight route guidance system 1 according to this embodiment includes a head-mounted display (HMD) 10, an unmanned aerial vehicle 12, an operation management system 14, and an operation terminal 16.

The HMD 10 is a display device that can be worn on a head of a user. In the following description, it is assumed that the HMD 10 in this embodiment is an optical see-through HMD, and the user wearing the HMD 10 can visually recognize the situation of a real space.

Figure 2A:
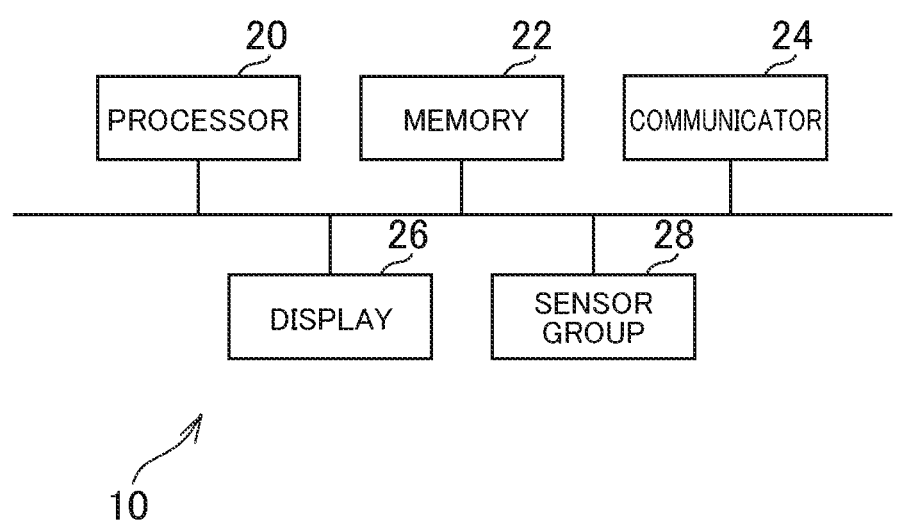
FIG. 2A is a diagram for illustrating an exemplary configuration of a head-mounted display in one embodiment of the present invention.

As illustrated in FIG. 2A, for example, the HMD 10 in this embodiment includes a processor 20, a memory 22, a communicator 24, a display 26, and a sensor group 28.

The processor 20 is a program control device, for example, a microprocessor, which is configured to operate in accordance with a program installed in the HMD 10, for example.

The memory 22 is a memory element such as a ROM, a RAM, or a flash memory. The memory 22 stores, for example, a program to be executed by the processor 20.

The communicator 24 is a communication interface such as a wireless LAN module or a Bluetooth (trademark) module.

The display 26 is a display that enables the wearer of the HMD 10 to visually recognize a virtual image together with the transmitted situation in the real space by using a half mirror, for example. The display 26 is arranged in front of eyes of the wearer of the HMD 10. Further, the display 26 in this embodiment is a binocular display that can display a three-dimensional image by displaying an image for a left eye and an image for a right eye, for example. The display 26 may be a display that cannot display a three-dimensional image, but can display only a two-dimensional image.

The sensor group 28 is a device including a global navigation satellite system (GNSS) receiver, for example, a global positioning system (GPS) receiver, an inertial sensor such as an acceleration sensor or a gyro sensor, and a geomagnetic sensor. The sensor group 28 can measure the position or posture of the HMD 10. The sensor group 28 may output measurement results, such as the position or posture of the HMD 10, to the processor 20 at a predetermined sampling rate. Further, the sensor group 28 may include a camera configured to pick up an image within the range of a visual field of the wearer of the HMD 10. This image is hereinafter referred to as a "visual field range image".

The HMD 10 is worn on the head of the operator of the unmanned aerial vehicle 12 or a manager managing the operator, for example.

The unmanned aerial vehicle 12 is an aerial vehicle that does not accommodate a person, and is, for example, an unmanned aerial vehicle configured to be driven by a battery or an engine (so-called drone).

Figure 2B:
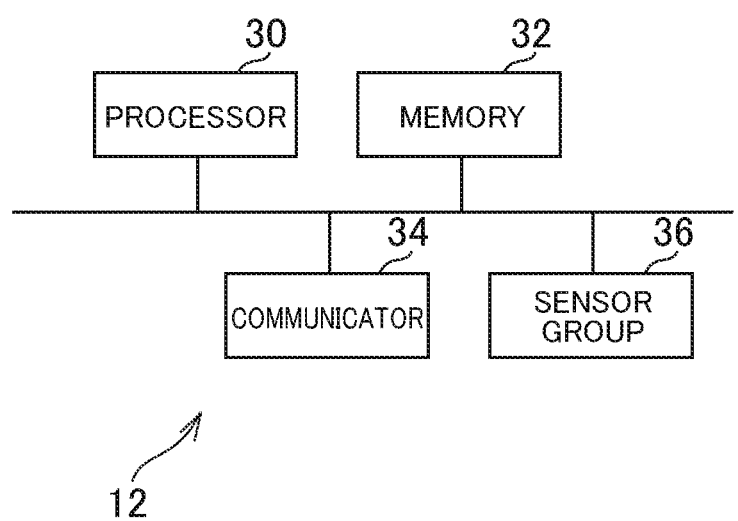
FIG. 2B is a diagram for illustrating an exemplary configuration of an unmanned aerial vehicle in one embodiment of the present invention.

For example, as illustrated in FIG. 2B, the unmanned aerial vehicle 12 in this embodiment includes a processor 30, a memory 32, a communicator 34, and a sensor group 36. The unmanned aerial vehicle 12 includes general hardware components such as a propeller, a motor, and a battery, but a description thereof is omitted here.

The processor 30 is a program control device, for example, a microprocessor, which is configured to operate in accordance with a program installed in the unmanned aerial vehicle 12, for example.

The memory 32 is a memory element such as a ROM, a RAM, or a flash memory. The memory 32 stores, for example, a program to be executed by the processor 30.

The communicator 34 is a communication interface such as a wireless LAN module or a Bluetooth module.

The sensor group 36 is a device including a GNSS receiver, for example, a GPS receiver, an altitude sensor such as an air pressure sensor, a light detection and ranging (LIDAR) sensor or a sound wave sensor, a camera, an inertial sensor, and a wind speed sensor. The sensor group 36 can measure the position or posture of the unmanned aerial vehicle 12. The sensor group 36 may output measurement results, such as the position or posture of the unmanned aerial vehicle 12, to the processor 30 at a predetermined sampling rate.

The operation management system 14 in this embodiment is a computer system including one or a plurality of server computers configured to perform operation management, for example, management of the flight route of the unmanned aerial vehicle 12.

The operation terminal 16 in this embodiment is, for example, a device for operating the unmanned aerial vehicle 12.

The unmanned aerial vehicle 12 in this embodiment may have an autonomous flight function. Further, in this case, when the operator or manager of the unmanned aerial vehicle 12 has determined that the unmanned aerial vehicle 12 in autonomous flight cannot stay on track of a planned flight route, the operator may use the operation terminal 16 to operate the unmanned aerial vehicle 12. In this case, the HMD 10 may be worn on the head of the manager managing the unmanned aerial vehicle 12 in autonomous flight. Alternatively, when the operator or manager of the unmanned aerial vehicle 12 has determined that the unmanned aerial vehicle 12 in autonomous flight cannot stay on track of the planned flight route, the HMD 10 may be worn on the head of the operator operating the unmanned aerial vehicle 12.

As illustrated in FIG. 1, the operation terminal 16 and the unmanned aerial vehicle 12 can communicate to/from each other. Further, the HMD 10 and the operation terminal 16 can communicate to/from each other. Further, the HMD 10 and the operation management system 14 can communicate to/from each other via a network 18, for example, the Internet. The HMD 10 and the unmanned aerial vehicle 12 may be able to communicate to/from each other directly without intervention of the operation terminal 16.

In this embodiment, for example, the operation management system 14 stores in advance flight route information indicating the flight route of the unmanned aerial vehicle 12. The flight route information may be, for example, a list of pieces of position information indicating a plurality of positions along the planned flight route of the unmanned aerial vehicle 12. The position information may include three-positional coordinate values representing the position indicated by the position information.

Coordinate values in the three-positional coordinate values indicating a horizontal position (e.g., X coordinate value and Y coordinate value) may be absolute coordinate values in an earth-centered earth-fixed coordinate system used by the GPS or the like (e.g., latitude and longitude). Further, the coordinate values in the three-positional coordinate values indicating the horizontal position (e.g., X coordinate value and Y coordinate value) may be relative coordinate values in a coordinate system having a departure location of the unmanned aerial vehicle 12 as its origin. Similarly, a coordinate value in the three-positional coordinate values indicating an altitude (e.g., Z coordinate value) may be the above-mentioned absolute coordinate value or the above-mentioned relative coordinate value. In the following description, it is assumed that the coordinate values indicating the horizontal position are absolute coordinate values and the coordinate value indicating the altitude is a relative coordinate value. Further, it is assumed that the wearer of the HMD 10, such as the operator or manager, stays near the departure location of the unmanned aerial vehicle 12, and the altitude of the wearer is a sum of the altitude of the departure location and the height of the wearer. A value indicating the height of the wearer may be a predetermined value, or may be a value input by the wearer, for example.

Further, the flight route information may include time point information indicating, for each of a plurality of positions, a time point at which the unmanned aerial vehicle 12 is to arrive at the position. For example, the position information included in the flight route information may be associated with time point information on the time point at which the unmanned aerial vehicle 12 is to arrive at the position.

Figure 3:
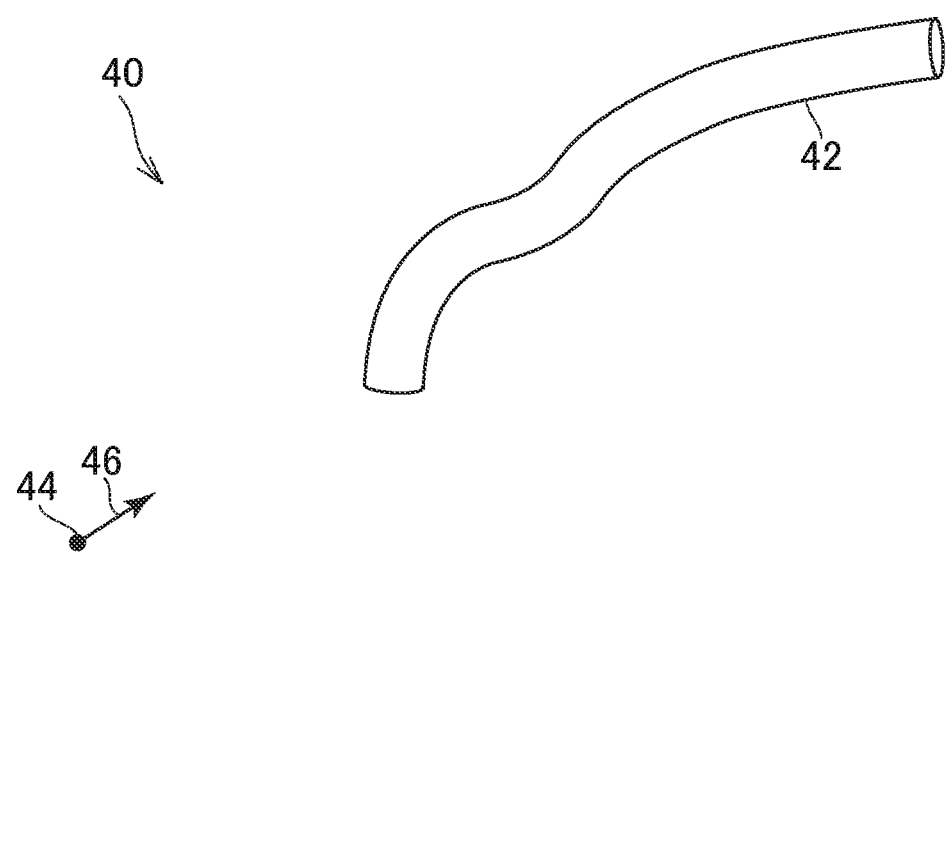
FIG. 3 is a diagram for illustrating an example of a virtual space.

Further, in this embodiment, for example, the flight route information is transmitted from the operation management system 14 to the HMD 10. Then, the HMD 10 generates a virtual space 40 illustrated in FIG. 3 based on the received flight route information. The virtual space 40 illustrated in FIG. 3 is, for example, a virtual three-dimensional space in which a flight route object 42 being a virtual three-dimensional object representing the flight route indicated by the flight route information is arranged. A position in the virtual space 40 is associated with a position in the real space on a one-to-one basis. Further, a direction in the virtual space 40 is associated with a direction in the real space on a one-to-one basis.

The flight route object 42 may be, for example, a virtual object representing a line connecting between three-dimensional coordinate values representing a position, which is indicated by position information included in the flight route information, in order of the list of pieces of position information included in the flight route information. In this case, for example, the flight route object 42 may be a virtual object representing a line connecting between the three-dimensional coordinate values representing the position, which is indicated by the position information included in the flight route information, in order of earlier time points indicated by the associated time point information. Further, for example, as illustrated in FIG. 3, the flight route object 42 may be a virtual object with a pillar or cylindrical shape having, as an axis, a line connecting between the three-dimensional coordinate values representing the position, which is indicated by the position information included in the flight route information, in order of the list of pieces of position information included in the flight route information.

Further, in this embodiment, for example, a visually recognized position and visually recognized direction in the real space are identified. In this case, for example, the visually recognized position and visually recognized direction in the real space may be identified based on a result of estimation by a publicly known estimation method. In this case, the visually recognized position may be associated with the position of the wearer of the HMD 10. Further, the visually recognized direction may be associated with the posture of the head of the wearer of the HMD 10.

Further, the visually recognized position may be associated with the position of the display 26, for example. Specifically, for example, the visually recognized position may be the center position of the display 26. Further, the visually recognized direction may be associated with the direction of the display 26, for example. Specifically, for example, the visually recognized direction may be a normal direction with respect to a display surface of the display 26.

Further, in this embodiment, for example, a visually recognized position 44 in the virtual space 40, which is associated with the visually recognized position in the real space, is identified. Further, a visually recognized direction 46 in the virtual space 40, which is associated with the visually recognized direction in the real space, is identified. As described above, the position in the virtual space 40 is associated with the position in the real space on a one-to-one basis, and the direction in the virtual space 40 is associated with the direction in the real space on a one-to-one basis. Thus, the visually recognized position 44 and the visually recognized direction 46 can be uniquely identified.

Figure 4:
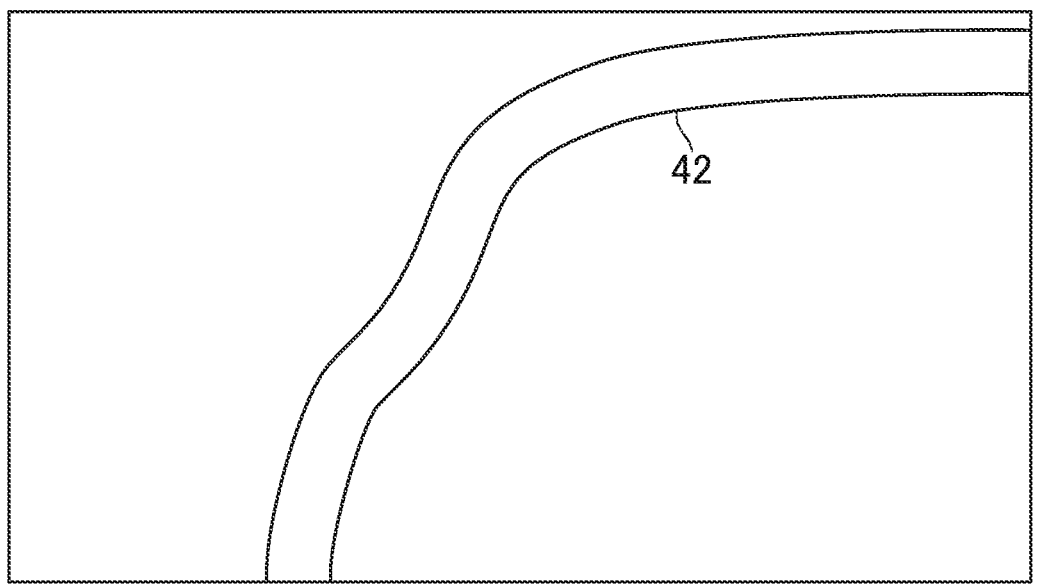
FIG. 4 is a diagram for illustrating an example of a flight route image.

Further, in this embodiment, for example, an image representing a flight route viewed from the visually recognized position in the real space and in the visually recognized direction in the real space is generated. In this case, for example, an image representing a situation viewed from the visually recognized position 44 in the virtual space 40 and in the visually recognized direction 46 in the virtual space 40 may be generated. The image generated in this manner is hereinafter referred to as a "flight route image". FIG. 4 is a diagram for illustrating an example of the flight route image. The flight route image illustrated in FIG. 4 includes an image of the flight route object 42.

Figure 5:
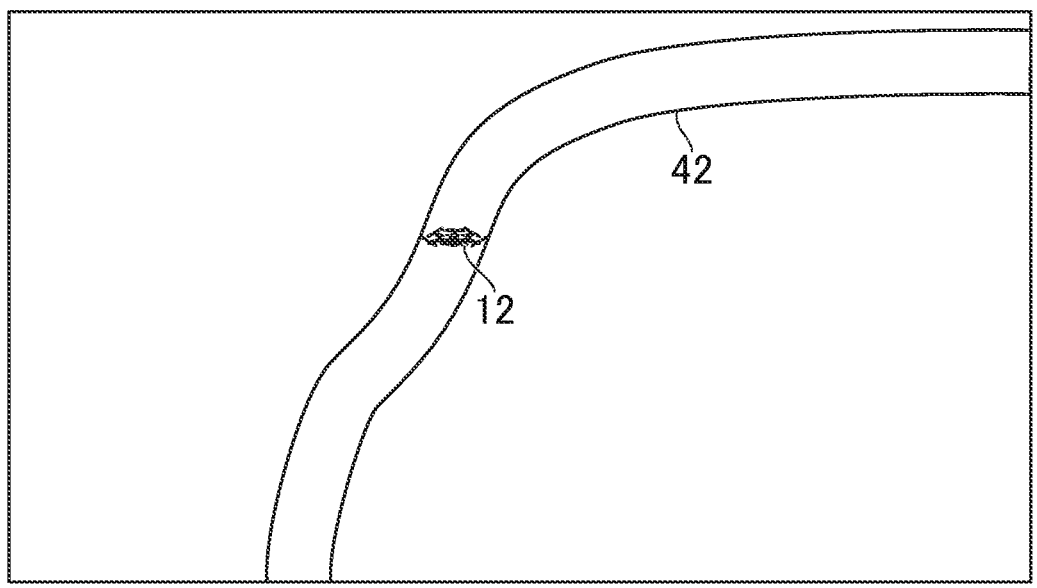
FIG. 5 is a diagram for illustrating an example of the unmanned aerial vehicle in a real space and the flight route image to be displayed on a display, which are visually recognized by a wearer of the head-mounted display.

Further, in this embodiment, the flight route image is displayed on the display 26 of the HMD 10 under a state in which the position of the flight route image is matched with the situation viewed from the visually recognized position in the visually recognized direction in the real space. The state in which the position is matched with the situation refers to a state in which the position of the flight route object 42 in the flight route image is adjusted so that the wearer of the HMD 10 visually recognizes such a real space as if the flight route object 42 were arranged at a desired position. Then, as illustrated in FIG. 5, while the unmanned aerial vehicle 12 is flying, the wearer of the HMD 10 can visually recognize the unmanned aerial vehicle 12 in the real space and the flight route image displayed on the display 26 at the same time. In this case, the unmanned aerial vehicle 12 illustrated in FIG. 5 is a real image, and the flight route image is a virtual image displayed on the display 26.

In this case, for example, the visual field of the wearer of the HMD 10 that can be visually recognized through the display 26 may be identified based on a result of measurement by the sensor group 28 and a design value of the display 26. Then, the HMD 10 may determine whether the flight route is included in the visual field based on the visual field of the wearer and the flight route information. Then, when it is determined that the flight route is included in the visual field, the HMD 10 may display the flight route image on the display 26.

When the wearer of the HMD 10 such as the operator or manager of the unmanned aerial vehicle 12 visually recognizes the situation illustrated in FIG. 5, the wearer of the HMD 10 can grasp the fact that the unmanned aerial vehicle 12 in flight stays on track of the flight route.

Figure 6:
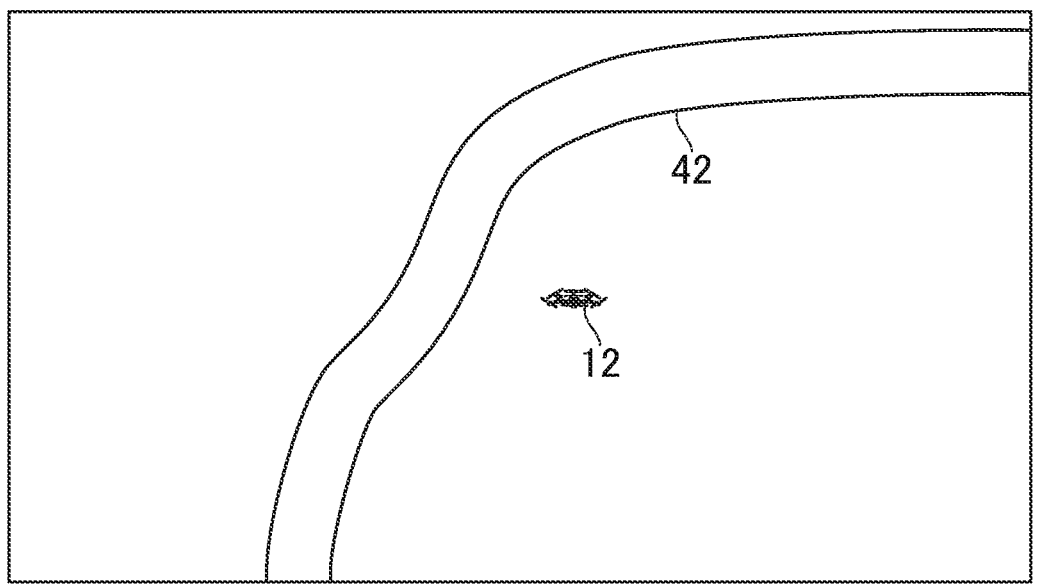
FIG. 6 is a diagram for illustrating another example of the unmanned aerial vehicle in the real space and the flight route image to be displayed on the display, which are visually recognized by the wearer of the head-mounted display.

Meanwhile, when the wearer of the HMD 10 such as the operator or manager of the unmanned aerial vehicle 12 visually recognizes the situation illustrated in FIG. 6, the wearer of the HMD 10 can grasp the fact that the unmanned aerial vehicle 12 in flight is deviating from the flight route.

In this manner, according to this embodiment, the operator, manager, or other such persons of the unmanned aerial vehicle 12 can easily grasp whether the unmanned aerial vehicle 12 in flight stays on track of the flight route.

Further, when the wearer of the HMD 10 visually recognizes the situation illustrated in FIG. 6, the wearer of the HMD 10 can easily grasp the fact that the unmanned aerial vehicle 12 is allowed to get back on track of the flight route by moving the unmanned aerial vehicle 12 in an upper left direction with respect to the wearer.

Meanwhile, in this embodiment, the result of estimating the visually recognized position or the visually recognized direction may include an error. The error may be caused not only due to the accuracy of processing of estimating the visually recognized position or the visually recognized direction, but also due to an error of the position or direction of the HMD 10 measured by the sensor group 28 of the HMD 10, or an error of the height of the wearer. In particular, when the direction of the HMD 10 is identified through integration of a measurement value of an acceleration sensor or gyro sensor, the error of the direction of the HMD 10 is likely to be accumulated. In this case, the wearer of the HMD 10 may visually recognize deviation of the unmanned aerial vehicle 12 in flight from the flight route, although the unmanned aerial vehicle 12 in flight stays on track of the flight route indicated by the flight route information in actuality.

In view of this, in this embodiment, it may be determined whether the unmanned aerial vehicle 12 stays on track of the flight route. In this case, for example, it may be determined whether the unmanned aerial vehicle 12 stays on track of the flight route based on the flight route information and the position of the unmanned aerial vehicle 12 measured by the sensor group 36 of the unmanned aerial vehicle 12. Then, whether an image obtained by correcting the position at which the flight route is represented is to be displayed may be controlled in accordance with the result of determination.

Figure 7:
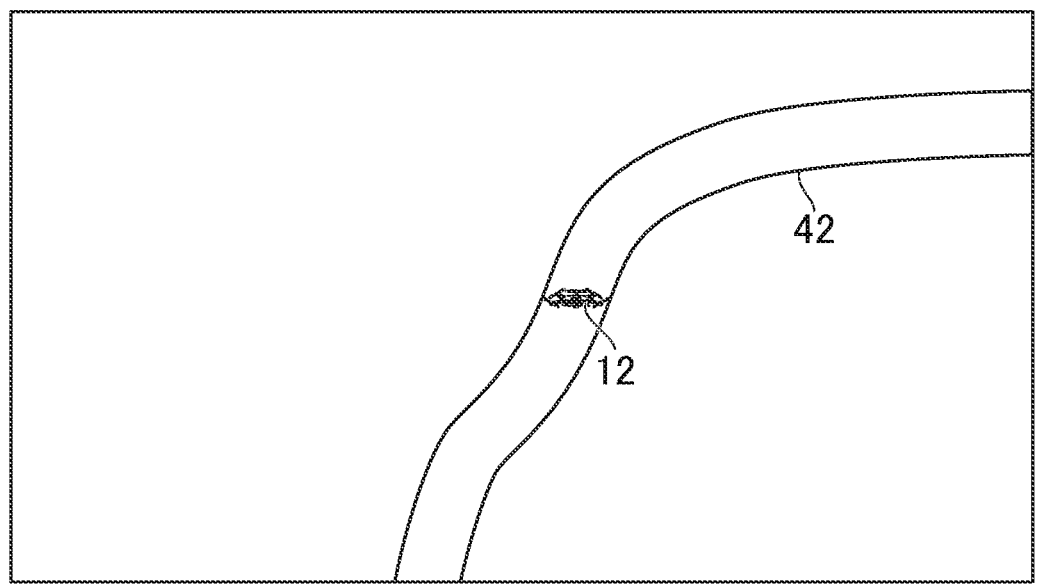
FIG. 7 is a diagram for illustrating still another example of the unmanned aerial vehicle in the real space and the flight route image to be displayed on the display, which are visually recognized by the wearer of the head-mounted display.

Now, there is assumed a situation in which the wearer of the HMD 10 visually recognizes the situation illustrated in FIG. 6 under a state in which the image is not corrected, for example. In this situation, when it is determined that the unmanned aerial vehicle 12 does not stay on track of the flight route, the image may not be corrected. On the contrary, when it is determined that the unmanned aerial vehicle 12 stays on track of the flight route, the image displayed on the display 26 may be corrected as illustrated in FIG. 7. In this case, for example, correction such as translation or rotation of the generated flight route image may be performed. This correction may be performed based on a relationship between the display 26 and the camera of the HMD 10 calibrated in advance, the visual field range image, and the desired position of the unmanned aerial vehicle 12 at the current time point in the flight route image, for example.

In this case, for example, the flight route image may be corrected so that the desired position of the unmanned aerial vehicle 12 at the current time point in the flight route image matches the position of the unmanned aerial vehicle 12 in the visual field range image.

Further, for example, a position on the flight route indicated in the flight route image, which is closest to the position of the unmanned aerial vehicle 12 in the visual field range image, may be identified. Then, the flight route image may be corrected so that the position on the flight route in the flight route image identified in this manner matches the position of the unmanned aerial vehicle 12 in the visual field range image.

Further, for example, a new flight route image may be generated by correcting the visually recognized position 44 or the visually recognized direction 46.

When the wearer of the HMD 10, such as the operator or manager of the unmanned aerial vehicle 12, visually recognizes the situation illustrated in FIG. 7, the wearer of the HMD 10 can grasp the fact that the unmanned aerial vehicle 12 in flight stays on track of the flight route.

Now, a description is further given of the function of the HMD 10 in this embodiment and processing to be executed by the HMD 10 in this embodiment.

Figure 8:
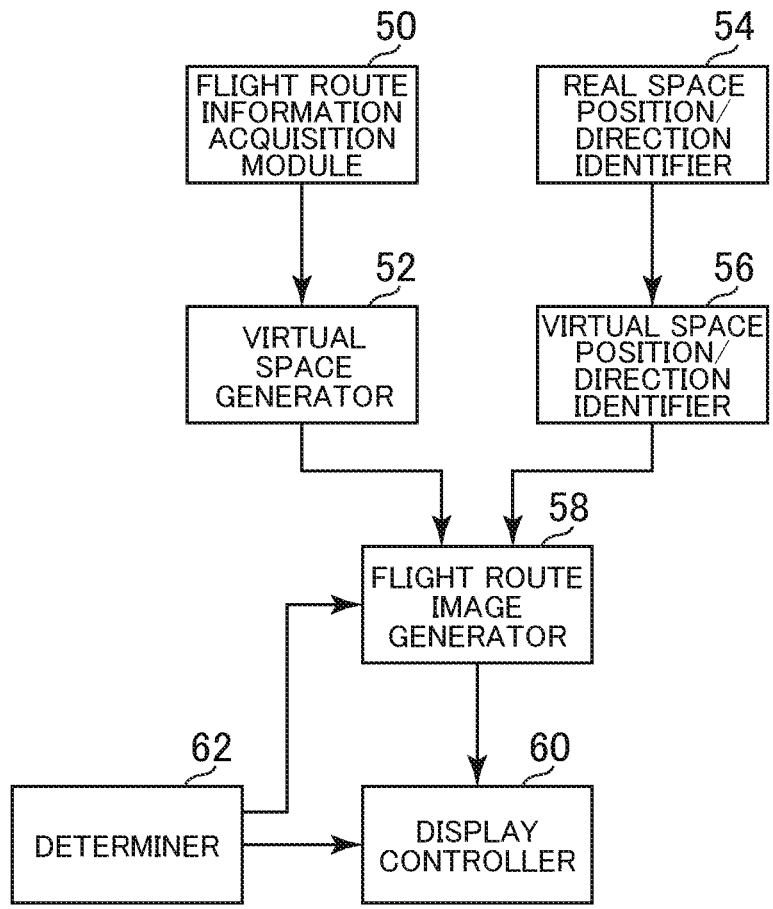
FIG. 8 is a functional block diagram for illustrating an example of functions to be implemented by the head-mounted display in one embodiment of the present invention.

FIG. 8 is a functional block diagram for illustrating an example of functions to be implemented by the HMD 10 in this embodiment. All the functions illustrated in FIG. 8 are not required to be implemented in the HMD 10 in this embodiment, and functions other than the functions illustrated in FIG. 8 may be implemented.

As illustrated in FIG. 8, the HMD 10 in this embodiment includes, for example, a flight route information acquisition module 50, a virtual space generator 52, a real space position/direction identifier 54, a virtual space position/direction identifier 56, a flight route image generator 58, a display controller 60, and a determiner 62 in terms of function.

The flight route information acquisition module 50 is mainly implemented by the processor 20 and the communicator 24. The virtual space generator 52, the virtual space position/direction identifier 56, the flight route image generator 58, and the determiner 62 are mainly implemented by the processor 20. The real space position/direction identifier 54 is mainly implemented by the processor 20 and the sensor group 28. The display controller 60 is mainly implemented by the processor 20 and the display 26.

The above-mentioned functions may be implemented by the processor 20 executing programs including commands corresponding to the above-mentioned functions, which are installed on the HMD 10 being a computer. Further, the programs may be supplied to the HMD 10 via the Internet or via a computer-readable information storage medium such as an optical disc, a magnetic disk, a magnetic tape, or a magneto-optical disk.

The flight route information acquisition module 50 is configured to acquire flight route information indicating the flight route of the unmanned aerial vehicle 12 in the real space in this embodiment, for example. The flight route information acquisition module 50 may acquire flight route information indicating a planned flight route of the unmanned aerial vehicle 12. As described above, the flight route information may include a list of three-dimensional coordinate values representing a plurality of positions along the planned flight route of the unmanned aerial vehicle 12, for example. Further, the flight route information may include time point information indicating a time point at which the unmanned aerial vehicle 12 is to arrive at the position for each of a plurality of positions on the flight route.

Further, the flight route information acquisition module 50 may receive the flight route information transmitted from the operation management system 14. Further, the flight route information acquisition module 50 may acquire the flight route information stored in the memory 22 of the HMD 10 in advance.

Further, the flight route information acquisition module 50 may acquire the flight route information indicating the actual flight route of the unmanned aerial vehicle 12. In this case, for example, the communicator 34 of the unmanned aerial vehicle 12 may repeatedly transmit, to the HMD 10, position information indicating the actual position or direction of the unmanned aerial vehicle 12, which is measured by the sensor group 36 of the unmanned aerial vehicle 12, at a predetermined time interval. Further, the flight route information acquisition module 50 may receive a series of pieces of position information transmitted from the unmanned aerial vehicle 12 at a predetermined time interval as the flight route information indicating the actual flight route of the unmanned aerial vehicle 12. The HMD 10 may receive the flight route information via the operation terminal 16, or may directly receive the flight route information from the unmanned aerial vehicle 12.

In this embodiment, for example, the virtual space generator 52 generates the virtual space 40 in which a virtual object associated with the flight route is arranged. In this case, for example, the virtual space 40 as illustrated in FIG. 3, in which the flight route object 42 representing the flight route indicated by the flight route information acquired by the flight route information acquisition module 50, may be generated.

In this embodiment, for example, the real space position/direction identifier 54 identifies the visually recognized position and visually recognized direction in the real space. In this case, the real space position/direction identifier 54 may identify the visually recognized position associated with the position of the display 26, at which the wearer of the HMD 10 visually recognizes the flight route image together with the situation viewed from the visually recognized position in the visually recognized direction in the real space, and the visually recognized direction associated with the direction of the display 26.

In this embodiment, for example, the virtual space position/direction identifier 56 identifies the visually recognized position 44 in the virtual space 40, which is associated with the visually recognized position in the real space identified by the real space position/direction identifier 54. Further, in this embodiment, for example, the virtual space position/direction identifier 56 identifies the visually recognized direction 46 in the virtual space 40, which is associated with the visually recognized direction in the real space identified by the real space position/direction identifier 54.

In this embodiment, for example, the flight route image generator 58 generate the flight route image as illustrated in FIG. 4, which represents a flight route viewed from the visually recognized position in the real space and in the visually recognized direction in the real space, based the flight route information. In this case, the flight route image generator 58 may generate the flight route image representing the situation viewed from the visually recognized position 44 in the virtual space 40 and in the visually recognized direction 46 in the virtual space 40.

Further, the flight route image generator 58 may generate the flight route image further representing the time point at which the unmanned aerial vehicle 12 is to arrive at the position for each of a plurality of positions on the flight route. For example, a flight route image that has different visual recognition properties, such as the color, brightness, or transparency, depending on the above-mentioned time point may be generated. For example, a flight route image that has a lower visual recognition property (e.g., lighter) at an earlier time point indicated by the associated time point information, and has a higher visual recognition property (e.g., darker) at a later time point indicated by the associated time point information may be generated. With this, the wearer of the HMD 10 can grasp the flight route at a later time point more easily.

Further, the flight route image generator 58 may generate a flight route image that depends on the current time point. For example, the flight route image generator 58 may generate a flight route image representing whether the time point at which the unmanned aerial vehicle 12 is to arrive at the position is before or after the current time point for each of a plurality of positions on the flight route. For example, the flight route image generator 58 may generate a flight route image in which a flight route before the current time point has a lower visual recognition property than that of a flight route after the current time point. Alternatively, the flight route image generator 58 may generate a flight route image in which the visual recognition property is not represented for a flight route before the current time point. Alternatively, the flight route image generator 58 may generate a flight route image in which a marker image is superimposed on the position at which the unmanned aerial vehicle 12 is to arrive at the current time point. With this, the wearer of the HMD 10 can grasp the position at which the unmanned aerial vehicle 12 is to arrive at the current time point. Further, the wearer of the HMD 10 can grasp more easily a route along which the unmanned aerial vehicle 12 is to fly.

Further, the flight route image generator 58 may generate a flight route image representing at least one of the planned flight route of the unmanned aerial vehicle 12 or the actual flight route (history of actual flight route) of the unmanned aerial vehicle 12, which is indicated by the flight route information. In this case, for example, the flight route image generator 58 may generate a flight route image representing the actual flight route, in addition to or in place of the planned flight route of the unmanned aerial vehicle 12. When a flight route image representing both of the planned flight route and the actual flight route is generated, a flight route image allowing the planned flight route and the actual flight route to be distinguished from each other may be generated. For example, a flight route image in which the planned flight route and the actual flight route have different visual recognition properties may be generated.

In this embodiment, for example, the display controller 60 displays the flight route image under a state in which the position of the flight route image is matched with the situation viewed from the visually recognized position in the visually recognized direction in the real space, on the display 26. That is, the flight route image is displayed on the display 26 under a state in which the position of the flight route object 42 in the flight route image is adjusted so that the wearer of the HMD 10 visually recognizes such a real space as if the flight route object 42 were arranged at a desired position. With this, the wearer of the HMD 10 can grasp the situation illustrated in FIG. 5 or FIG. 6. In this case, the display controller 60 may display the flight route image generated by the flight route image generator 58 on the display 26.

In addition to the flight route image, the display controller 60 may display information on the unmanned aerial vehicle 12 such as the speed of the unmanned aerial vehicle 12, the position (e.g., latitude, longitude, or altitude) of the unmanned aerial vehicle 12, a distance from the operator to the unmanned aerial vehicle 12, a distance to a destination, or a remaining battery capacity.

In this embodiment, for example, the determiner 62 determines whether the unmanned aerial vehicle 12 stays on track of the flight route. In this case, the determiner 62 may determine whether the unmanned aerial vehicle 12 stays on track of the flight route based on the measured position of the unmanned aerial vehicle 12 and the flight route information. In this case, the position of the unmanned aerial vehicle 12 may be measured by the sensor group 36 of the unmanned aerial vehicle 12.

Further, in this case, the display controller 60 may control whether an image in which the position at which the flight route is represented is corrected is to be displayed, depending on the result of determination by the determiner 62. In this case, for example, when it is determined that the unmanned aerial vehicle 12 stays on track of the flight route, the flight route image generator 58 may generate the corrected flight route image. The flight route image generator 58 may generate a new flight route image by correcting the visually recognized position 44 and the visually recognized direction 46. Alternatively, the display controller 60 may perform correction such as translation or rotation of the flight route image generated by the flight route image generator 58.

Figure 9:
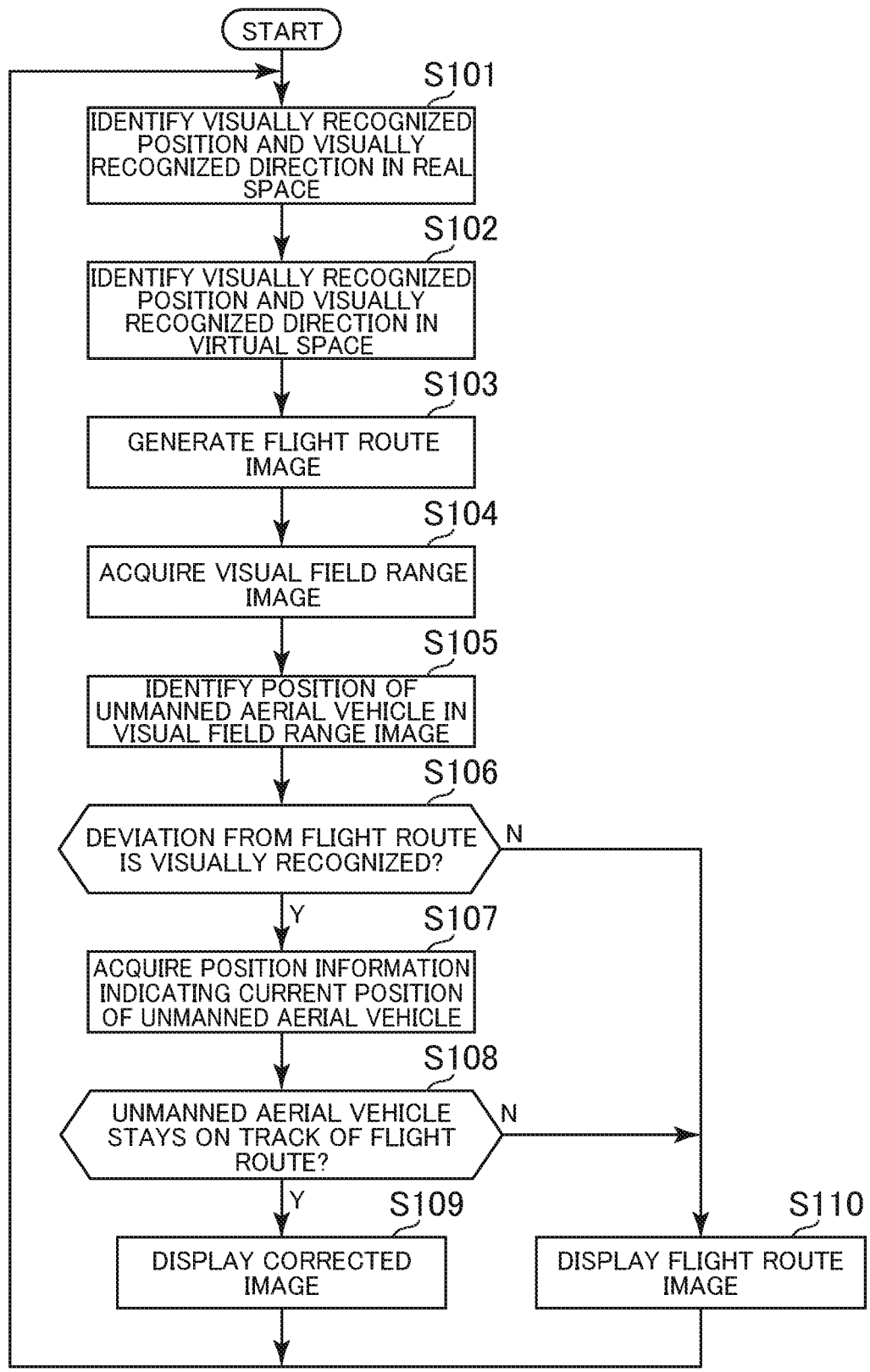
FIG. 9 is a flow chart for illustrating an exemplary flow of processing to be executed by the head-mounted display in one embodiment of the present invention.

Now, a description is given of an exemplary flow of processing to be executed by the HMD 10 in this embodiment with reference to a flow chart illustrated in FIG. 9. In this example of processing, it is assumed that the flight route information has already been acquired by the flight route information acquisition module 50. Further, it is assumed that the virtual space generator 52 has generated the virtual space 40 illustrated in FIG. 3.

Further, in this embodiment, for example, it is assumed that the flight route image is displayed on the display 26 at a predetermined frame rate. Further, it is assumed that the processing illustrated in Step S101 to Step S110 is repeatedly executed at the predetermined frame rate.

First, the real space position/direction identifier 54 identifies the visually recognized position in the real space and the visually recognized direction in the real space (Step S101).

Then, the virtual space position/direction identifier 56 identifies the visually recognized position 44 in the virtual space 40 and the visually recognized direction 46 in the virtual space 40 (Step S102). In this case, the visually recognized position 44 in the virtual space 40, which is associated with the visually recognized position in the real space identified by the processing illustrated in Step S101, is identified. Further, the visually recognized direction 46 in the virtual space 40, which is associated with the visually recognized direction in the real space identified by the processing illustrated in Step S101, is identified.

Then, the flight route image generator 58 generates a flight route image representing the situation viewed from the visually recognized position 44 in the virtual space 40 and in the visually recognized direction 46 in the virtual space 40 (Step S103).

Then, the determiner 62 acquires a visual field range image picked up by the camera included in the HMD 10 (Step S104).

Then, the determiner 62 identifies the position of the unmanned aerial vehicle 12 in the visual field range image acquired by the processing illustrated in Step S104 by using a publicly known image recognition technology (Step S105).

Then, the determiner 62 determines whether the wearer of the HMD 10 visually recognizes deviation of the unmanned aerial vehicle 12 from the flight route based on the flight route image generated in the processing illustrated in Step S103 and the position of the unmanned aerial vehicle 12 identified in the processing illustrated in Step S105 (Step S106). This determination may be performed based on the relationship between the display 26 and the camera of the HMD 10 calibrated in advance, the position of the unmanned aerial vehicle 12 detected in the visual field range image, and the flight route represented in the generated flight route image.

When the determiner 62 has determined that the wearer of the HMD 10 visually recognizes deviation of the unmanned aerial vehicle 12 from the flight route (Step S106: Y), the flight route information acquisition module 50 acquires position information indicating the current position of the unmanned aerial vehicle (Step S107).

In the processing illustrated in Step S107, the flight route information acquisition module 50 may request the unmanned aerial vehicle 12 to transmit the position information indicating the current position. Then, the flight route information acquisition module 50 may receive the position information indicating the current position of the unmanned aerial vehicle 12, which is transmitted by the unmanned aerial vehicle 12 in response to the request. The HMD 10 may receive the position information via the operation terminal 16, or may receive the position information directly from the unmanned aerial vehicle 12. Alternatively, the flight route information acquisition module 50 may acquire the position information indicating the current position from among pieces of position information repeatedly transmitted from the unmanned aerial vehicle 12 as the flight route information.

Then, the determiner 62 determines whether the unmanned aerial vehicle 12 stays on track of the flight route based on the position information acquired in the processing illustrated in Step S107 and the flight route information (Step S108). In this case, for example, a distance between a position represented by three-dimensional coordinate values, which is indicated by the position information acquired in the processing illustrated in Step S107, and a position at which the unmanned aerial vehicle 12 is to arrive at the current time point, which is represented by three-dimensional coordinate values in the flight route information, may be identified. Then, the unmanned aerial vehicle 12 may be determined to stay on track of the flight route when the value indicating the identified distance is equal to or smaller than a threshold value.

The method of determining whether the unmanned aerial vehicle 12 stays on track of the flight route is not limited to the above-mentioned example. For example, a distance between the position represented by the three-dimensional coordinate values, which is indicated by the position information acquired in the processing illustrated in Step S107, and a line representing the flight route identified based on the flight route information may be identified. Then, when the value indicating the identified distance is equal to or smaller than a predetermined threshold value, the unmanned aerial vehicle 12 may be determined to stay on track of the flight route.

Further, different threshold values may be used for a horizontal direction (e.g., X coordinate value and Y coordinate value) and a height direction (e.g., Z coordinate value). For example, a point on a two-dimensional plane, which is represented by XY coordinate values indicated by the position information acquired in the processing illustrated in Step S107, and a point on a two-dimensional plane, which is represented by XY coordinate values of a position at which the unmanned aerial vehicle 12 is to arrive at the current time point represented by the three-dimensional coordinate values in the flight route information, may be identified. Further, a distance between those two points may be identified as a first distance. Further, for example, a point on a one-dimensional straight line, which is represented by a Z coordinate value indicated by the position information acquired in the processing illustrated in Step S107, and a point on a one-dimensional straight line represented by a Z coordinate value of the position at which the unmanned aerial vehicle 12 is to arrive at the current time point, which is represented by the three-dimensional coordinate values in the flight route information, may be identified. Further, a distance between those two points may be identified as a second distance. Further, when a value indicating the first distance is equal to or smaller than a first threshold value and a value indicating the second distance is equal to or smaller than a second threshold value, the unmanned aerial vehicle 12 may be determined to be stay on track of the flight route.

When the unmanned aerial vehicle 12 is determined to stay on track of the flight route (Step S108: Y), the display controller 60 displays such an image as shown in FIG. 7, in which the position at which the flight route is represented is corrected for the flight route image generated in the processing illustrated in Step S103 (Step S109).

When the unmanned aerial vehicle 12 is determined not to stay on track of the flight route (Step S108: N), the display controller 60 displays the flight route image generated in the processing illustrated in Step S103 (Step S110). Also when the wearer of the HMD 10 is determined to visually recognize that the unmanned aerial vehicle 12 stays on track of the flight route in the processing illustrated in Step S106 (Step S106: N), the display controller 60 displays the flight route image generated in the processing illustrated in Step S103 (Step S110). The processing illustrated in Step S110 corresponds to an example of processing of displaying a flight route image under a state in which the position of the flight route image is matched with the situation viewed from the visually recognized position in the visually recognized direction in the real space, on the display 26.

Then, the processing returns to Step S101.

In the above-mentioned example of processing, the processing illustrated in Step S104 to Step S106 may not be executed. In this case, the processing illustrated in Step S107 may be executed after the processing illustrated in Step S103.

Further, when correction is not performed, the processing illustrated in Step S104 to Step S109 is not required to be executed.

In this case, the processing illustrated in Step S110 may be executed after the processing illustrated in Step S103.

In this embodiment, for example, a plurality of selectable flight routes may be indicated in the flight route information. Further, a flight route selectable at the current time point and a flight route that can be selected in the future but cannot be selected at the current time point (e.g., a flight route passing through an area that is not currently safe but is predicted to become safe in the future) may be indicated in the flight route information. Further, the flight route information may indicate one flight route branching into a plurality of flight routes.

In this manner, when the flight route information indicates a plurality of flight routes, the flight route image generator 58 may generate a flight route image allowing a selected flight route and an unselected flight route to be distinguished from each other. For example, a flight route image in which the selected flight route and the unselected flight route have different visual recognition properties may be generated. For example, a flight route image in which the currently selected flight route has a higher visual recognition property than that of the unselected flight route may be generated. Further, a flight route image in which a currently selectable flight route has a higher visual recognition property than that of the unselected flight route may be generated.

Further, the flight route image generator 58 may generate a flight route image in a mode that depends on whether the unmanned aerial vehicle 12 stays on track of the flight route. For example, when the unmanned aerial vehicle 12 is determined to stay on track of the flight route, a flight route image including a marker indicating the fact that the unmanned aerial vehicle 12 in flight stays on track of the flight route may be generated. Further, when the unmanned aerial vehicle 12 is determined not to stay on track of the flight route, a flight route image including a marker indicating the fact that the unmanned aerial vehicle 12 in flight is deviating from the flight route may be generated. Both or one of the marker indicating the fact that the unmanned aerial vehicle 12 in flight stays on track of the flight route and the marker indicating the fact that the unmanned aerial vehicle 12 in flight is deviating from the flight route may be arranged. When both of the marker indicating the fact that the unmanned aerial vehicle 12 in flight stays on track of the flight route and the marker indicating the fact that the unmanned aerial vehicle 12 in flight is deviating from the flight route may be arranged, those markers can desirably be identified so as to have different colors, for example. Those markers may be arranged at positions in the flight route image, which are associated with the position at which the unmanned aerial vehicle 12 is to arrive at the current time point in the real space.

The flight route image generator 58 may generate an image including the above-mentioned marker together with the image of the flight route object 42 as an image representing the flight route viewed from the visually recognized position in the visually recognized direction. Further, the flight route image generator 58 may generate an image including only the above-mentioned marker without the image of the flight route object 42 as the image representing the flight route viewed from the visually recognized position in the visually recognized direction.

Further, the flight route information acquisition module 50 may acquire the flight route information indicating the flight routes of the plurality of unmanned aerial vehicles 12. Then, the flight route image generator 58 may generate a flight route image representing the flight routes of the plurality of unmanned aerial vehicles 12.

In this case, for example, the flight route image generator 58 may generate a flight route image in which the plurality of unmanned aerial vehicles 12 have different visual recognition properties of the flight route. For example, the flight route image generator 58 may generate a flight route image that allows the flight route of the unmanned aerial vehicle 12, which is operated by an operator being the wearer of the HMD 10, namely, the operator viewing the flight route image, and the flight route of another unmanned aerial vehicle 12 to be distinguished from each other.

For example, there may be generated a flight route image in which the flight route of the unmanned aerial vehicle 12 operated by the operator being the wearer of the HMD 10 has a higher visual recognition property than that of the flight route of another unmanned aerial vehicle 12. Alternatively, there may be generated a flight route image in which the flight route of the unmanned aerial vehicle 12 operated by the operator being the wearer of the HMD 10 has a lower visual recognition property than that of the flight route of another unmanned aerial vehicle 12. With this, the wearer of the HMD 10 can predict a possibility of the unmanned aerial vehicle 12 operated by the operator and another unmanned aerial vehicle 12 colliding with each other. Thus, it is possible to reduce the possibility of the unmanned aerial vehicle 12 operated by the operator and another unmanned aerial vehicle 12 colliding with each other.

Further, when the unmanned aerial vehicle 12 takes off, the position of the unmanned aerial vehicle 12 in the visual field range image picked up by the camera included in the HMD 10 may be detected to estimate the relationship between the position of the unmanned aerial vehicle 12 and the position of the HMD 10. With this, it is possible to more accurately estimate the position of the wearer of the HMD 10 in a coordinate system having a takeoff location of the unmanned aerial vehicle 12 as its origin.

Further, the flight route image generator 58 may generate a flight route image that depends on whether the unmanned aerial vehicle 12 is in front or back of the flight route from the viewpoint of the visually recognized position.

For example, it is assumed that the camera included in the HMD 10 is a camera including a measurement device capable of measuring a distance to the unmanned aerial vehicle 12. In this case, it may be determined whether the unmanned aerial vehicle 12 is in front or back of the flight route from the viewpoint of the visually recognized position based on the flight route information and the distance to the unmanned aerial vehicle 12 measured by the measurement device. Then, when the unmanned aerial vehicle 12 is in front of the flight route from the viewpoint of the visually recognized position, a flight route image representing the flight route in red may be generated. Further, when the unmanned aerial vehicle 12 is in back of the flight route from the viewpoint of the visually recognized position, a flight route image representing the flight route in yellow may be generated. Further, when a value indicating a difference between the distance to the unmanned aerial vehicle 12 and the distance to the flight route from the viewpoint of the visually recognized position is smaller than a predetermined value, a flight route image representing the flight route in blue may be generated.

Further, for example, when the unmanned aerial vehicle 12 includes an omnidirectional camera, image recognition may be executed for an image picked up by the camera to identify the position of an object, for example, an obstacle. Then, a flight route image that depends on whether an object such as an obstacle or a human intersects with the flight route may be generated. For example, a red flight route image may be generated when an object such as an obstacle or a human intersects with the flight route, or otherwise, a blue flight route image may be generated. Further, for example, a flight route image in which a portion in which an object, for example, an obstacle intersects with the flight route is red and the other portions are blue may be generated.

Note that, the present invention is not limited to the above-mentioned embodiment.

For example, in the above description, the HMD 10 is set as the optical see-through HMD 10. However, the present invention can also be applied even when the HMD 10 is a video see-through HMD 10. In this case, the real space position/direction identifier 54 may identify a visually recognized position associated with the position of the camera included in the video see-through HMD 10, and a visually recognized direction associated with the image-pickup direction of the camera. The camera is, for example, a camera configured to pick up an image of the front view of the HMD 10. Then, the flight route image generator 58 may generate a flight route image in which the flight route viewed from the visually recognized position in the visually recognized direction is superimposed on the image picked up by the camera. For example, an image in which the flight route image illustrated in FIG. 4 is superimposed on the image picked up by the camera included in the video see-through HMD 10 may be generated. The flight route image generated in this manner can be regarded as an example of the image in which the situation of the real space and the flight route are represented under a state in which the position of the flight route image is matched with the situation viewed from the visually recognized position in the visually recognized direction in the real space. Then, the display controller 60 may display the flight route image on the display 26 included in the video see-through HMD 10. As a result, the flight route image is displayed on the display 26 under a state in which the position of the flight route image is matched with the situation viewed from the visually recognized position in the visually recognized direction in the real space.

Further, the range of application of the present invention is not limited to the HMD 10. For example, the present invention can also be applied to a situation in which the operator or manager of the unmanned aerial vehicle 12 visually recognizes a display, which is not the HMD 10, on which the image picked up by the camera arranged in the real space and the flight route image illustrated in FIG. 4 are superimposed on each other. The camera and the display may be separated from each other. In this case, for example, the real space position/direction identifier 54 may identify the visually recognized position associated with the position of the camera and the visually recognized direction associated with the image-pickup direction of the camera. Then, the flight route image generator 58 may generate an image in which the flight route viewed from the visually recognized position in the visually recognized direction is superimposed on the image picked up by the camera. Then, the display controller 60 may display the flight route image on the display, which is not the HMD 10.

Further, in this embodiment, a part or all of the functions illustrated in FIG. 8 may be implemented in the unmanned aerial vehicle 12, the operation management system 14, or the operation terminal 16.

Further, the specific character strings and numerical values described above and the specific numerical values and character strings in the drawings are merely exemplary, and the present invention is not limited to those character strings and numerical values.

The invention claimed is:

1. A flight route guidance system, comprising:
at least one processor; and
at least one memory device that stores a plurality of instructions which, when executed by the at least one processor, causes the at least one processor to:
acquire flight route information indicating a flight route of a first unmanned aerial vehicle in a real space;
identify a visually recognized position of a user of the flight route guidance system, and a visually recognized direction in the real space of a user of the flight route guidance system, the visually recognized direction being a direction that the user's head is facing;
generate an image representing the flight route viewed from the visually recognized position in the visually recognized direction based on the flight route information;
display the image under a state in which a position of the image is matched with a situation viewed from the visually recognized position in the visually recognized direction in the real space, on a display;
determine whether the first unmanned aerial vehicle is on track of the flight route;
when it is determined that the first unmanned aerial vehicle is on the flight route, control whether to display an image that corrects a position at which the flight route is represented by translating or rotating the image;
wherein the system corrects the position at which the flight route is represented so that the first unmanned aerial vehicle is depicted on the flight route; and
generate the image in a mode that depends on whether the first unmanned aerial vehicle stays on track of the flight route, wherein the mode includes a marker indicating whether or not the first unmanned aerial vehicle has stayed on track of the flight route.

2. The flight route guidance system according to claim 1, wherein the at least one memory device that stores the plurality of instructions which further causes the at least one processor to:

identify the visually recognized position associated with a position of the display included in an optical see-through head-mounted display at which a wearer of the optical see-through head-mounted display visually recognizes the image together with the situation viewed from the visually recognized position in the visually recognized direction in the real space; and identify the visually recognized direction associated with a direction of the display, wherein the wearer of the head-mounted display is the user of the flight route guidance system.

3. The flight route guidance system according to claim 2, wherein the optical see-through head-mounted display is worn on a head of an operator of the first unmanned aerial vehicle.

4. The flight route guidance system according to claim 2 wherein the position and the direction of the user of the flight route guidance system is obtained irrespective of a visually recognized object.

5. The flight route guidance system according to claim 1, wherein the at least one memory device that stores the plurality of instructions which further causes the at least one processor to:

identify the visually recognized position associated with a position of a camera picking up an image of the real space, and the visually recognized direction associated with an image-pickup direction of the camera, and generate the image in which the flight route viewed from the visually recognized position in the visually recognized direction is superimposed on the image picked up by the camera.

6. The flight route guidance system according to claim 5, wherein the at least one memory device that stores the plurality of instructions which further causes the at least one processor to:

identify the visually recognized position associated with the position of the camera included in a video see-through head-mounted display, and the visually recognized direction associated with the image-pickup direction of the camera, and display the image on the display included in the video see-through head-mounted display.

7. The flight route guidance system according to claim 6, wherein the video see-through head-mounted display is worn on a head of an operator of the first unmanned aerial vehicle.

8. The flight route guidance system according to claim 1, wherein the at least one memory device that stores the plurality of instructions which further causes the at least one processor to:

generate a virtual space in which a virtual object representing the flight route is arranged, identify a visually recognized position in the virtual space, which is associated with the visually recognized position in the real space; and identify a visually recognized direction in the virtual space, which is associated with the visually recognized direction in the real space, and generate the image representing a situation viewed from the visually recognized position in the virtual space and in the visually recognized direction in the virtual space.

9. The flight route guidance system according to claim 1, wherein the at least one memory device that stores the plurality of instructions which further causes the at least one processor to:

determine whether the first unmanned aerial vehicle stays on track of the flight route based on a measured position of the first unmanned aerial vehicle and the flight route information.

10. The flight route guidance system according to claim 1, wherein the flight route information indicates, for each of a plurality of positions on the flight route, a time point at which the first unmanned aerial vehicle is to arrive at the each of the plurality of positions on the flight route, and wherein the at least one memory device that stores the plurality of instructions which further causes the at least one processor to generate the image further representing the time point.

11. The flight route guidance system according to claim 10, wherein the at least one memory device that stores the plurality of instructions which further causes the at least one processor to:

generate the image representing whether or not the time point at which the first unmanned aerial vehicle is to arrive or has arrived at each of the plurality of positions on the flight route is before or after a current time point, for each of a plurality of positions on the flight route.

12. The flight route guidance system according to claim 1, wherein the flight route information indicates a plurality of selectable flight routes, and wherein the at least one memory device that stores the plurality of instructions which further causes the at least one processor to generate the image allowing a selected flight route and an unselected flight route among the plurality of selectable flight routes to be distinguished from each other.

13. The flight route guidance system according to claim 1, wherein the at least one memory device that stores the plurality of instructions which further causes the at least one processor to generate the image representing at least one of a planned flight route of the first unmanned aerial vehicle or an actual flight route of the first unmanned aerial vehicle which is indicated by the flight route information.

14. The flight route guidance system according to claim 1, wherein the at least one memory device that stores the plurality of instructions which further causes the at least one processor to:

acquire the flight route information indicating the flight route of each of a plurality of unmanned aerial vehicles, and generate the image representing the flight route of each of the plurality of unmanned aerial vehicles.

15. The flight route guidance system according to claim 14, wherein the at least one memory device that stores the plurality of instructions which further causes the at least one processor to generate the image allowing the flight route of the first unmanned aerial vehicle operated by an operator viewing the image and a flight route of a second unmanned aerial vehicle to be distinguished from each other.

16. The flight route guidance system according to claim 1, wherein the first unmanned aerial vehicle has an autonomous flight function.

17. The flight route guidance system according to claim 1, wherein the direction that the user faces is obtained by determining the posture of the head of the wearer of a head-mounted display.

18. The flight route guidance system according to claim 1, wherein the first unmanned aerial vehicle is recognizable in the display.

19. The flight route guidance system according to claim 1, wherein the system corrects the position at which the flight route is represented based on a relationship between the display and a camera of a head-mounted display worn by the user, the image, and a desired position of the first unmanned aerial vehicle at a current time point.

20. The flight route guidance system according to claim 1, wherein the system determines whether the first unmanned aerial vehicle is on track of the flight route based on the flight route information and a position of the unmanned aerial vehicle measured by a sensor of the first unmanned aerial vehicle.

21. A flight route guidance device, comprising:
at least one processor; and
at least one memory device that stores a plurality of instructions which, when executed by the at least one processor, causes the at least one processor to:
acquire flight route information indicating a flight route of an unmanned aerial vehicle in a real space;
identify a visually recognized position of a user of the flight route guidance device, and a visually recognized direction in the real space of a user of the flight route guidance device, the visually recognized direction being a direction that the user's head is facing;
generate an image representing the flight route viewed from the visually recognized position in the visually recognized direction based on the flight route information;
display the image under a state in which a position of the image is matched with a situation viewed from the visually recognized position in the visually recognized direction in the real space, on a display;
determine whether the first unmanned aerial vehicle is on track of the flight route;
control, when it is determined that the first unmanned aerial vehicle is on the flight route, whether to display an image that corrects a position at which the flight route is represented by translating or rotating the image;
cause the processor to correct the position at which the flight route is represented so that the first unmanned aerial vehicle is depicted on the flight route; and
generate the image in a mode that depends on whether the first unmanned aerial vehicle stays on track of the flight route,
wherein the mode includes a marker indicating whether or not the first unmanned aerial vehicle has stayed on track of the flight route.

22. A flight route guidance method, comprising:
acquiring flight route information indicating a flight route of an unmanned aerial vehicle in a real space;
identifying a visually recognized position of a user of the flight route guidance method, and a visually recognized direction in the real space of a user of the flight route guidance method, the visually recognized direction being a direction that the user's head is facing;
generating an image representing the flight route viewed from the visually recognized position in the visually recognized direction based on the flight route information;
displaying the image under a state in which a position of the image is matched with a situation viewed from the visually recognized position in the visually recognized direction in the real space, on a display;
determining whether the first unmanned aerial vehicle is on track of the flight route;
controlling, when it is determined that the first unmanned aerial vehicle is on the flight route, whether to display an image that corrects a position at which the flight route is represented by translating or rotating the image;
correcting the position at which the flight route is represented so that the first unmanned aerial vehicle is depicted on the flight route; and
generating the image in a mode that depends on whether the first unmanned aerial vehicle stays on track of the flight route,
wherein the mode includes a marker indicating whether or not the first unmanned aerial vehicle has stayed on track of the flight route.

* * * * *